May 20, 1941. W. D. FOSTER ET AL 2,243,047
CONTROL METHOD AND MECHANISM FOR PHOTOGRAPHIC PRINTERS
Filed Sept. 24, 1934 4 Sheets-Sheet 1
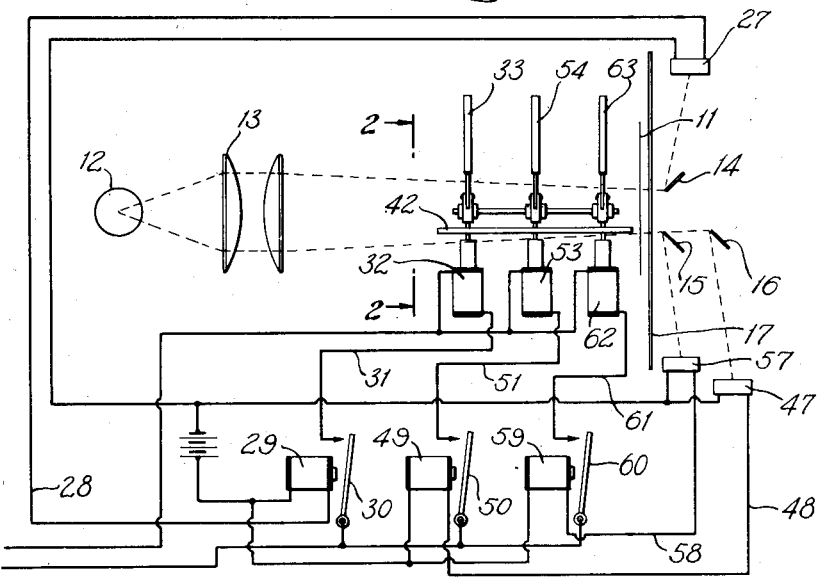
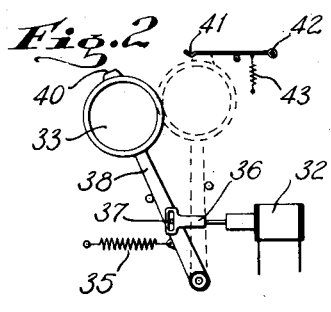
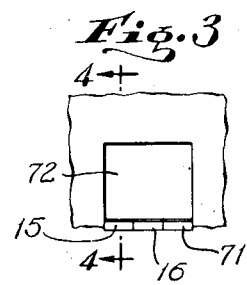
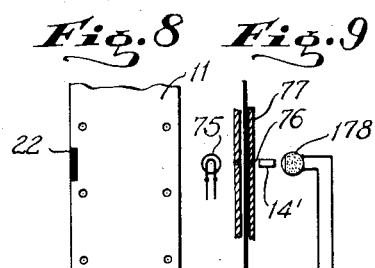
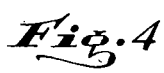
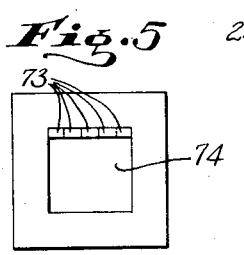
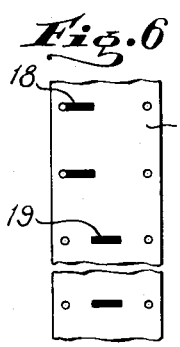
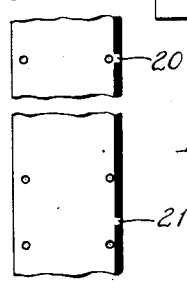
INVENTOR
WARREN DUNHAM FOSTER & EARLE L. PARMELEE, DECEASED,
BY PEOPLES-PITTSBURGH TRUST COMPANY, EXECUTOR.
By Warren D. Foster
ATTORNEY May 20, 1941.  W. D. FOSTER ET AL  2,243,047
CONTROL METHOD AND MECHANISM FOR PHOTOGRAPHIC PRINTERS
Filed Sept. 24, 1934  4 Sheets-Sheet 2
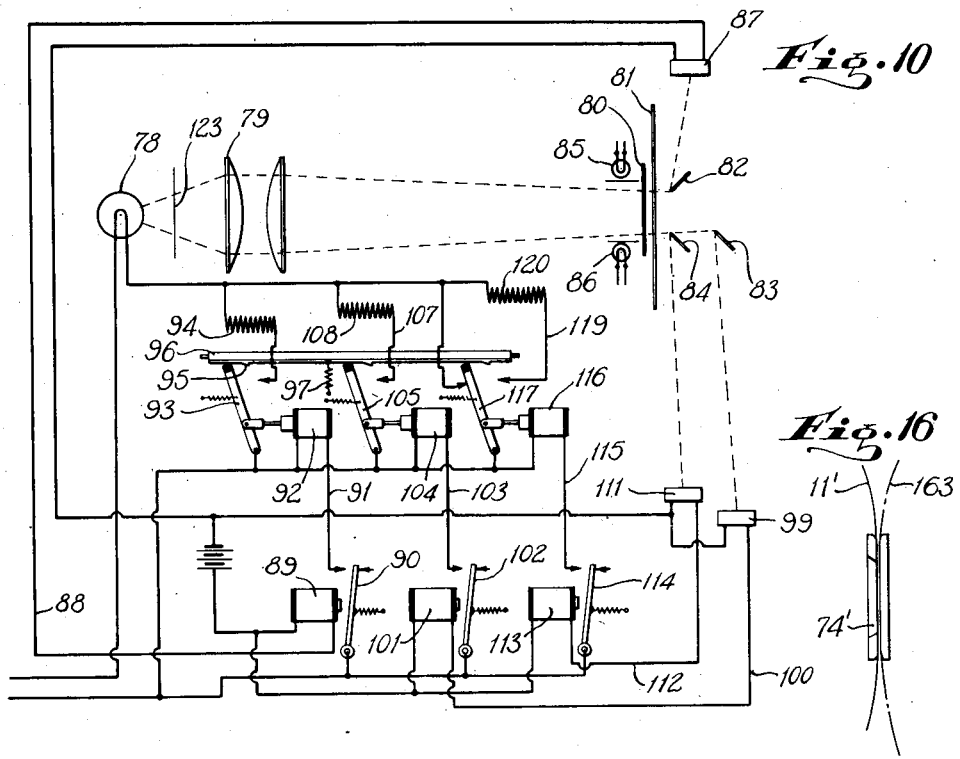
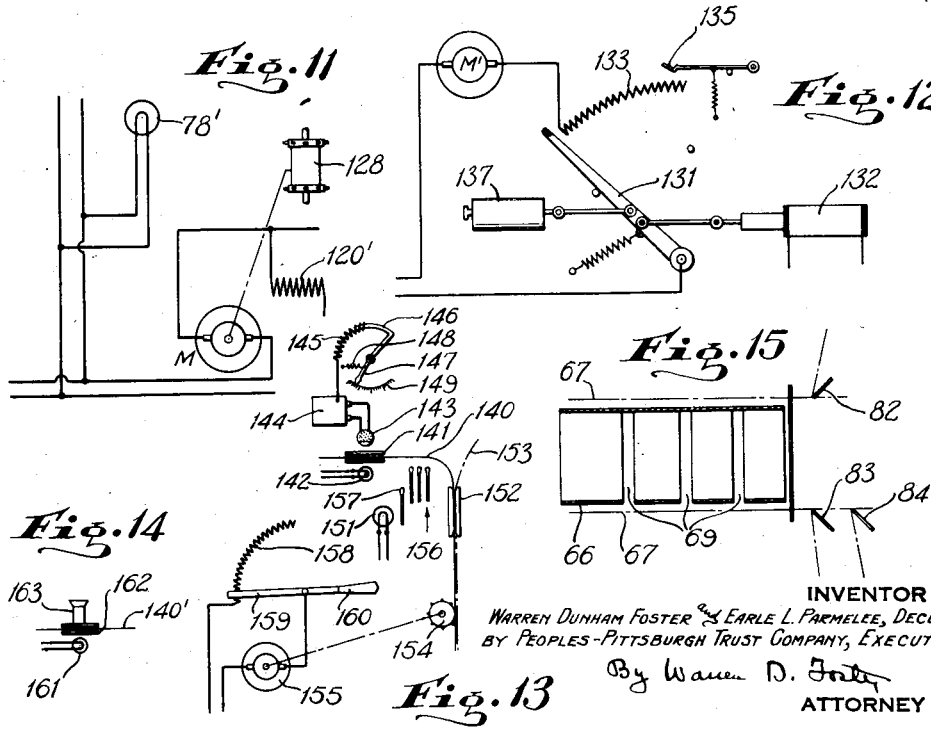
INVENTOR
WARREN DUNHAM FOSTER & EARLE L. PARMELEE, DECEASED,
BY PEOPLES-PITTSBURGH TRUST COMPANY, EXECUTOR.
By Warren D. Foster
ATTORNEY INVENTOR
WARREN DUNHAM FOSTER & EARLE L. PARMELEE, DECEASED,
BY PEOPLES-PITTSBURGH TRUST COMPANY, EXECUTOR.
By Warren D. Foster
ATTORNEY May 20, 1941.  W. D. FOSTER ET AL  2,243,047
CONTROL METHOD AND MECHANISM FOR PHOTOGRAPHIC PRINTERS
Filed Sept. 24, 1934  4 Sheets-Sheet 4
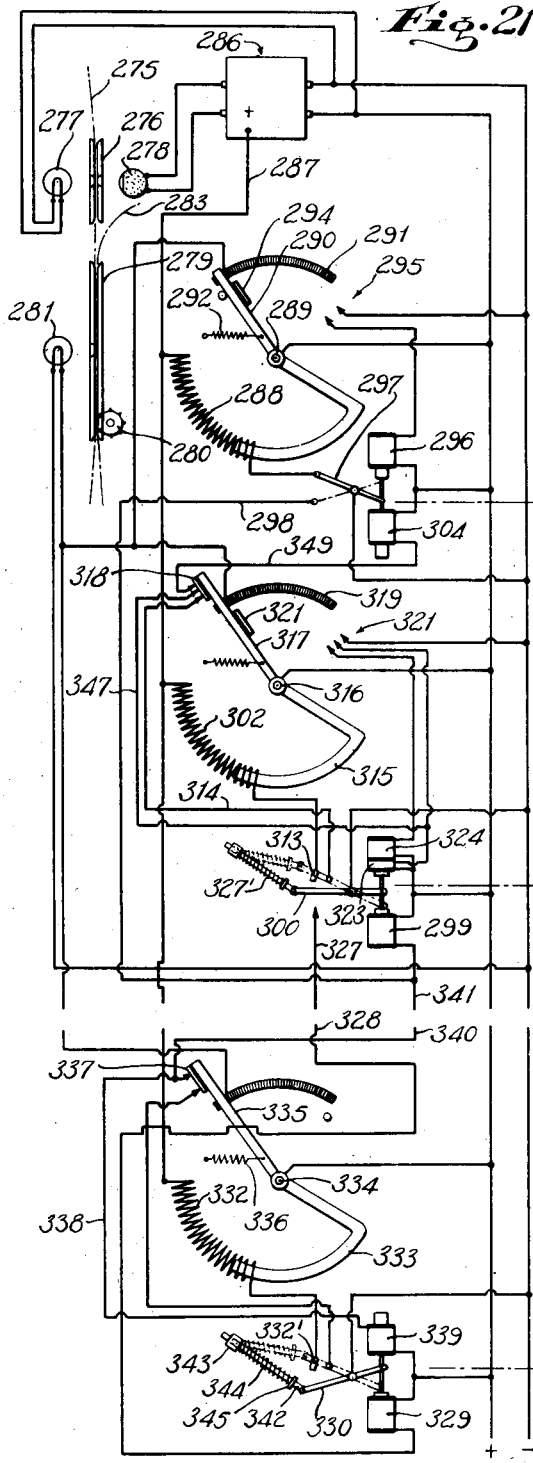
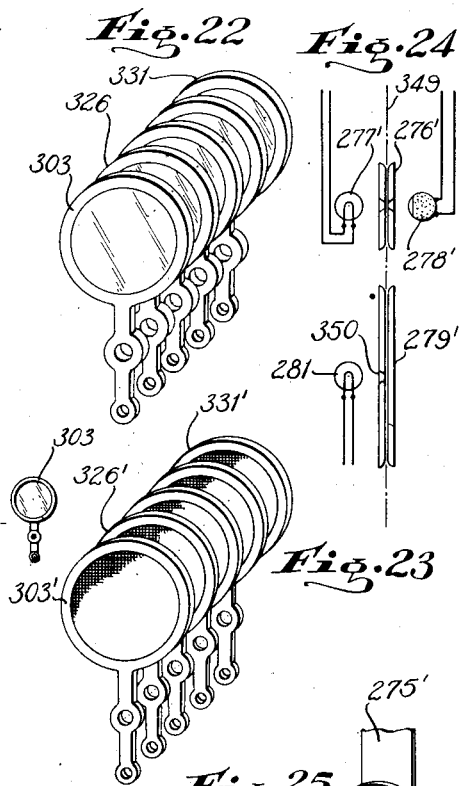
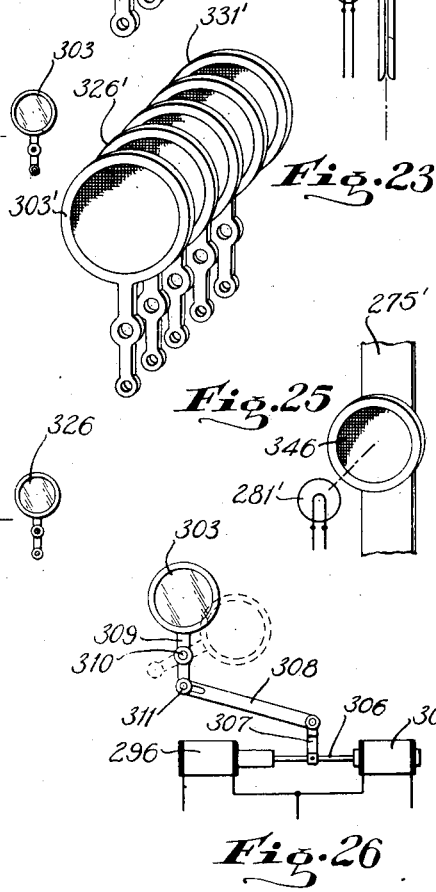
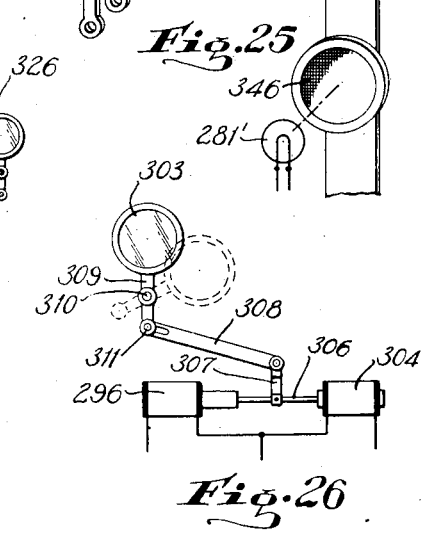
INVENTOR
WARREN DUNHAM FOSTER AND EARLE L. PARMELEE, DECEASED,
BY PEOPLES-PITTSBURGH TRUST COMPANY, EXECUTOR.
By Warren D. Foster
ATTORNEY Patented May 20, 1941

2,243,047

UNITED STATES PATENT OFFICE 2,243,047

CONTROL METHOD AND MECHANISM FOR PHOTOGRAPHIC PRINTERS

Warren Dunham Foster, Washington Township, Bergen County, N. J., and Earle L. Parmelee, deceased, late of Pittsburgh, Pa., by Peoples-Pittsburgh Trust Company, executor, Pittsburgh, Pa., assignors, by direct and mesne assignments, to Kinatome Patents Corporation, Ridgewood, N. J., a corporation of New York Application September 24, 1934, Serial No. 745,320

28 Claims. (Cl. 95—75)

This application is a continuation in part of our application Serial Number 706,437, filed January 12, 1934, now Patent No. 2,213,212, which in turn is a division of our application Serial Number 105,159, filed April 28, 1926, which on January 16, 1934, matured as Patent Number 1,944,024. In both of said applications we describe and claim means operated by light passed through a film for controlling in a particular manner desired various operations of the film handling apparatus itself and operations of apparatus associated therewith. In our immediately parent application, we describe and claim apparatus in which the speed of operation of the film feeding mechanism is determined by such light-responsive signals as is also the amount of light which is effective upon the film. In the present application, we apply our invention specifically to a printing or reversing apparatus. A primary object, therefore, of the present invention is specifically to apply the subject matter generally set out in our parent applications to a particular type of film handling apparatus operated in particular ways.

In our parent applications, we control the apparatus by means of changes in the translucency of successive portions of the moving film. A light beam, modified by such successive portions, operates a control mechanism. In the present application, such changes may be caused also by signalling portions applied to the film or by the density of the film itself. An object of the present invention, therefore, is to improve upon the parent applications by using the density of the film itself, alternatively to signals which are applied to predetermined portions of the film, to control the speed of operation of the film and the light effective thereupon.

As is well understood in the motion picture art, in producing a positive film from a negative film or in reversing a negative film into a positive film, it is necessary to modify the effectiveness of the printing light in accordance with changes in the density of the successive portions of the negative so that the resulting positive will be of uniform density. In preferred forms of our present invention, we accomplish such modification by means controlled by the film itself. We may exercise this control in various ways, as preferably by introducing resistance into the circuit of the light source or alternatively by maintaining the light source constant and varying the effectiveness of the light impinging upon the film by changing the speed of movement of the film through the light beam, thereby varying the exposure. In order to avoid the difficulties attendant upon too great variations in speed, we may use such variations to determine the minor and delicate changes in intensity, and rely upon screens or other light retarding instrumentalities, automatically interposed in the light beam, to accomplish the major variations. Alternatively, we may accomplish such minor variations by changes in the resistance in circuit with the printing light while using screens for the major variations. By such methods, we are able to limit the use of resistance in the circuit of the light source to such small amounts as will cause no change in color values and hence in printing effectiveness and secure full range of gradation of light values by such secondary means.

An important object of our invention is the control of a printing operation by methods and/or means which do not depend upon any change in the beam of a printing light or in the source thereof, as by varying the speed at which a film is moved through a beam of light of unchanging intensity.

Among the further objects of our invention are the provision of improved means for:

1. Controlling the placing of resistance in circuit with the motor of a film handling apparatus and its removal therefrom;
2. Controlling the placing of resistance in circuit with the light source of a film handling apparatus and its removal therefrom;
3. Operating light modifying means;
4. Operating means for modifying light from a constant source;
5. Operating means for modifying a light source;
6. Controlling the speed of film movement by a brake, preferably fluid operated, applied to the driving mechanism;
7. Controlling the speed of film movement by applying a braking force to the driving motor, preferably by the introduction of resistance into the field of a motor.

It also is to be noted that we supply means whereby the introduction of one light modifying or circuit changing means into effective relation with the film automatically removes from such effective relation whatever other light modifying or circuit changing means previously may have been in such relation.

A further object of our invention is the provision of means whereby "fade in" and "fade out" may be automatically accomplished in a printing operation.

Another object of our invention is the reduction of the heat impinging upon a film which is being printed or reversed. A further object is the provision of improved means for the control of the heat which impinges upon a film while it is being printed or reversed.

An important object of our invention is to accomplish the more extreme changes in desired light intensity or light effectiveness by one means and the finer changes by another.

We also provide method and/or means whereby the light changes in a printing operation may be in part automatic and in part under the control of an operator.

A most important object of our invention is to provide an automatic printing or reversal machine in which the film itself controls the entire operation either through signals placed upon it or alternatively through the density of the negative itself in combination with means responsive to radiant energy.

Throughout this specification we refer to photographic printing and to the reversal of a photographic negative into a positive. So far as our invention is concerned, the two operations may be considered as interchangeable. Our invention can be applied in some of its phases to either step printing or continuous printing.

It has been proposed to change the effectiveness of a light beam impinging upon a film by means of the movement of a shutter or a diaphragm operated by mechanism which is actuated by a photo-electric cell or similar instrumentality. Such a construction necessitates the rapid movement of a relatively large mass of material for very short distances in order to give the fine gradations which are necessary in a printing operation. An important object of the present invention is to improve upon such mechanism either by eliminating screens or shutters entirely and depending upon resistance in circuit with the printing light source or with the motor or upon other means of changing motor speed, and alternatively upon such means to accomplish the finer gradations and the movement of screens or the like to and from predetermined positions to accomplish the major gradations. It will thus be readily understood that the finer changes which determine the effectiveness of a printing operation are under the control, according to our invention, of very much more responsive and easily and accurately operated instrumentalities than those previously proposed.

Other objects, characteristics, and advantages will be apparent from the following portion of this specification, the attached drawings and the subjoined claims. For purposes of illustration only we are showing only certain preferred forms of our invention but it will be readily understood that we are in no way limiting ourselves to these particular exemplifications since changes may be made therein without departing from the spirit of our invention or the scope of our broader claims.

In the drawings:

Figure 1 is a diagrammatic view showing means for moving light retarding screens into and out of the beam of a printing light, certain parts being omitted for clarity;

Figure 2 is a view taken along the line 2—2 of Figure 1 looking in the direction of the arrows and shows mechanism for operating such screens;

Figure 3 is a partial front elevational view of a gate showing one form of window or aperture;

Figure 4 is a vertical sectional view on the line 4—4 of Figure 3;

Figure 5 is a view similar to Figure 3 illustrating a modified form of aperture;

Figure 6 is a detailed view on a large scale of a portion of the film illustrating one manner in which any of the signals herein referred to may be applied to a film in the space provided between the individual images or "frames," the controls being in the form of opaque portions;

Figure 7 is a view corresponding to Figure 6, but showing the control exercised by predetermined translucent portions placed in the space provided in a margin of a film;

Figure 8 is a view corresponding to Figure 7, but showing the control exercised by predetermined opaque portions placed in such margins;

Figure 9 is a sectional view corresponding to Figure 8;

Figure 10 is a view corresponding to Figure 1, but showing the control of the effective printing light exercised by the means of resistance placed in and removed from the circuit of the printing light;

Figure 11 is a partial view corresponding to Figure 10, but showing the control exercised by means of changes in motor speed;

Figure 12 is a view corresponding to Figure 2, but showing the control exercised by means of resistance gradually added to and removed from the circuit of the motor;

Figure 13 shows our invention as applied to a manually operable device;

Figure 14 is a fragmentary view corresponding to Figure 13, but showing an eye piece substituted for the photoelectric indicating device of Figure 13;

Figure 15 is a detailed view showing shielding means for the light screens of Figure 1;

Figure 16 shows our invention as applied to a printer as distinct from an apparatus in which a film is reversed;

Figure 17:
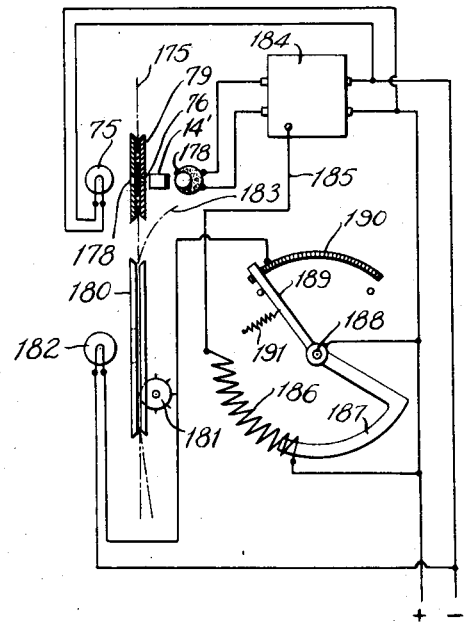
Figure 17 is a diagrammatic view showing our invention applied directly to resistance in circuit with the printing light source and controlled in accordance with the characteristics of the negative film.
Figure 18:
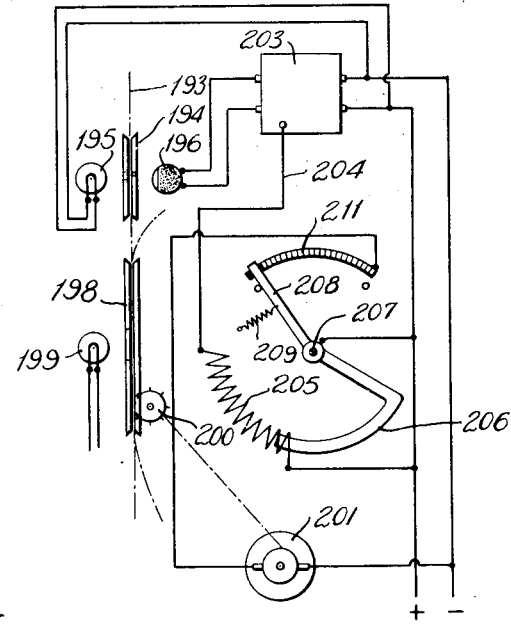
Figure 19:
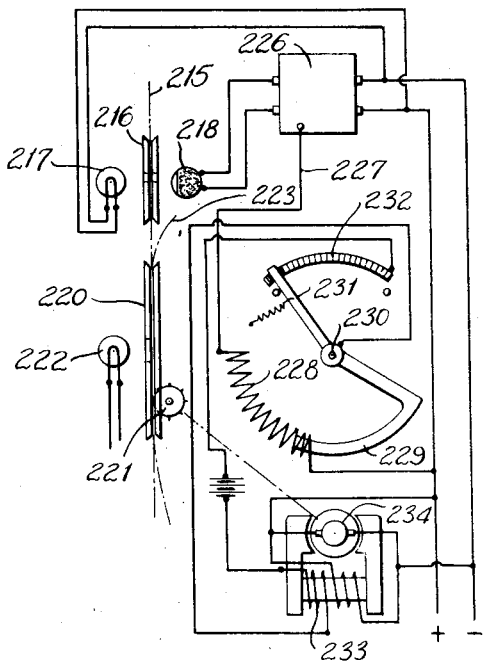

Figure 18 corresponds to Figure 17, but shows the control exercised by means of resistance in the motor circuit;

Figure 19 corresponds to Figure 18, but shows the control exercised by a special braking winding applied to the motor.

Figure 20:
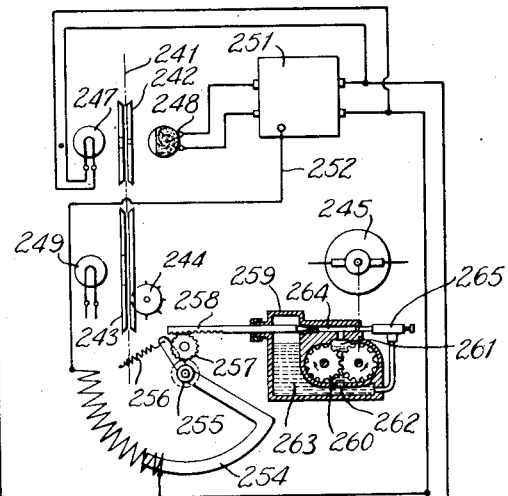

Figure 20 corresponds to Figures 18 and 19, but shows the control applied by means of a fluid brake in the motion transmitting train of the motor and feed sprocket;

Figure 21 is a diagrammatic view showing our invention as applied to the combination of means for changing the intensity of the printing light and the use of light retarding screens;

Figure 22 shows such screens in the form of filters of the type which change the density of the beam without affecting the wave length;

Figure 23 shows a form alternative to that of Figure 22 in which modification of the light is effectuated by wire mesh screens;

Figure 24 is a diagrammatic view of our invention as of the form of Figure 19 as applied to a reversal process;

Figure 25 shows a fixed heat and light absorbing screen interposed between the printing light source and the film;

Figure 26 shows mechanism for operating light retarding screens, such as those shown in Figures 22 and 23, in the form of the invention shown in Figure 21.

In carrying out our invention, we may pass a negative film 11 through a beam from a printing light source 12 which passes through condensing lenses 13. Between this negative film and signalling mirrors 14, 15 and 16, we interpose a shutter 17 of any conventional type, to be used only when step printing is employed. The movement of the film and the shutter, if one is used, may be as described in our parent application, or in any conventional or desired way. The number of mirrors used will be equal to the number of positions upon the film, relatively different one from the other, for the signals which are employed. The mounting of the mirrors is later described. Cooperating with the several mirrors 14, 15 and 16, and with additional mirrors if necessary, are signals placed upon any desired portion of the film as taught in our parent application and for example as shown in Figures 6, 7, and 8 of the drawings. Such signals and their operation may be as described in our parent applications. As shown in Figure 6, signalling portions indicated at 18 and 19 may be placed between the "frames" or picture bearing portions of the film and cooperate with appropriately placed mirrors, to actuate photo-electric cells or other instrumentalities responsive to radiant energy. Similarly, as indicated in Figure 7, translucent signalling portions such as 20 and 21 may be employed. Similarly as indicated in Figure 8, opaque signalling portions 22 and 23 may be placed upon the edge of the film and may cooperate with appropriate mirrors or other reflecting means. Either or both edges of the film may be employed. When the signal itself is translucent, it is necessary to render the remainder of the edge opaque, as can very readily be done. A masque may be applied, and an opaque dye brushed on by hand, or the negative may be fed through a simple machine in which a brush applies the dye to the edge. This task needs be done but once to any one negative. The dye may be of such a character that later it may readily be removed by means which do not injure the film. One advantage of the use of translucent signals is that the remaining non-signalling portion of the edge is rendered opaque thus blanking out various edge markings, such as the name of the maker of the film, which might otherwise interfere with a signalling operation.

In such cases as it is desired to make use of signals which cause each cell to emit a plurality of different responses, the width of the signalling portions may be varied.

A common practice in motion picture printing is to mutilate an edge of the film by forming notches which actuate members which control the mechanism which determines the intensity of the printing light. Alternatively metal contact clips may be added. Such indicia, as is readily apparent, weaken the film and often cause its breakage. Signals such as we employ do not have these disadvantages. Moreover, once a film is notched, according to the practice of one laboratory, it is not in proper condition for printing by another laboratory, and it is permanently impaired. Metal contact clips may be removed after use by one laboratory (but seldom are), but such removal often injures the negative. With signals of our type, not only is the negative entirely unimpaired, but the signals may be easily removed without the slightest injury to the film. Thus we have provided a method of automatic film printing which obviates one of the most common complaints of owners of negatives.

Any desired type of photo-electric cell may be used, with signals of an opaque or translucent type as is appropriate to the particular cell. Photolytic material may be employed, or a thermo-couple. For simplicity, in the subjoined claims, we make use of the term "photo-electric cell," but it is to be understood that we employ this term generically as meaning any signalling device responsive to radiant energy, whether the particular response is to radiant energy in the form of visible light or invisible light or of heat, and whether that response takes the form of modifying an electric current already produced or of producing an electrical current.

It is of course understood that in the forms of our invention in which we make use of signals, the negative is "timed" before being printed. That is to say, the density of the negative is determined, and the appropriate signals, as described above or in our parent applications, to modify the printing light in accordance with such determination, are placed upon the film.

As a signalling impulse resulting from light passed through a signal as described above is reflected by the mirror 14 to a photo-electric cell 27, the electrical impulse so produced or modified passes through a lead 28 and operates a magnet 29 which moves a switch member 30 to such position that it closes a lead 31 and operates a solenoid 32 which rotates a screen 33 into light intercepting position against power of a spring 35. A slotted arm 36, cooperating with a pin 37, is effective to move the standard 38 of the screen 33 to the right, as shown in Figure 2. As the screen 33 is moved almost completely to the right as shown in this figure, a cam formation 40 in the rim of the screen 33 engages with a detent 41 mounted upon a shaft 42 and operated by a spring 43 which holds the screen 33 in light intercepting position against the power of the spring 35. The screen 33 is of uniform density and may be of the type shown in Figure 22 or of that of Figure 23.

As another signal appears, it may operate a photo-electric cell 47 through the mirror 16. The cell 47 through a lead 48 operates a magnet 49 which moves a switch bar 50 to position to close a circuit through a lead 51 which operates a solenoid 53, which corresponds to the solenoid 32. Means attaching the solenoid 53 and its screen 54 may be the same as previously described for the solenoid 32 and the screen 33. This solenoid 53 will swing a screen 54 into light intercepting position. This screen is of uniform density, but of a density different from that of screen 33. As the screen 54 reaches the detent 41, its forwardly extending portion corresponding to the formation 40 will raise the detent 41 against the power of a spring 43 long enough to release the formation 40 for the screen 33 to be removed from light intercepting position by its spring 35.

The mirror 15, when actuated by the appropriate signal on the film, in cooperation with a photo-electric cell 57 and a lead 58, operates a magnet 59 which moves a switch element 60 to position to close a circuit through a lead 61 which operates a solenoid 62 which brings a screen 63 into position, as previously described for the screens 33 and 54. As the screen 63, which is of a density different from that of screens 33 and 54, is brought into position, any other screen which may then be in position will be snapped back out of the beam of light, as previously described. In Figure 1, we illustrate our invention as applied to a mechanism employing three screens only, but any desired number may be used. It is to be understood that more than one of the screens may be operated to the light intercepting position at the same time. Any appropriate combination may be employed, merely by using more than one signal simultaneously.

As is best shown in Figure 15, a protective enclosure 66 surrounds the beam of light from the source 12, but permits portions 67 from such light to pass along externally thereof, such portions being effective to operate the signalling devices previously described. Openings 69 in this protective element are provided for the reception of screens 33, 54 and 63.

Various types of apertures suitable for use with our invention are shown in Figures 3, 4, 5 and 9. If desired mirrors 15, 16 and 71 may be placed behind suitable openings and immediately below a space 72 corresponding to the picture area of the film to cooperate with signals placed between the picture areas, as shown in Figure 6, or a similar construction with various mirrors 73 as shown in Figure 5 placed at the top of the space 76 may be employed, all as taught in our parent applications. It will of course be understood that any convenient arrangement of mirrors may be employed, as taught in our original parent application, or photo-electric cells or the like may be placed directly in line with a suitable light transmitting aperture.

A convenient arrangement of signalling aperture and its associated parts is shown in Figure 9. A pilot light 75 projects a beam through a signalling aperture 76 in a pilot gate 77 and upon a mirror 14', which directs a signalling beam upon a radiant responsive element, as upon a cell 178 later described.

Instead of placing uniform density screens in the beam of the printing light, as shown in Figure 10 we may accomplish the same result by means of resistance added to the circuit of a printing light. In such cases we pass light from a source 78 through condensing lenses 79 and a negative film 80, and across the path of a shutter 81, if desired, and upon mirrors 82, 83 and 84 which cooperate with various photo-electric cells or the like. Since the printing light itself changes from time to time owing to the addition of resistance to its line and its removal therefrom it is necessary in this form of our invention to supply pilot lights 85 and 86 which are of constant intensity, suitably baffled from the remainder of the apparatus, to operate the signalling circuits. Light from the source 85 passes to the mirror 82 and thence to the photo-electric cell or the like 87 and through a lead 88 operates a magnet 89 to move a switch arm 90 to close a circuit through a lead 91 which through a switch arm 93 closes a circuit to a resistance 94 in circuit with the printing light source 78. As will be readily apparent from Figure 10, as the switch arm 93 is moved to the right its end, suitably insulated, will contact with a cam surface 95 upon a bar 96 and raise this bar against the influence of a spring 97. If at this time any other switch bar is in contact, it will immediately snap out of contact under the influence of its spring, unless the circuit to its controlling solenoid is then also closed.

Similarly through the mirror 83, a signal, responsive to light passed by the pilot light 86, will actuate a photo-electric cell 99 which through a lead 100 operates a magnet 101 which moves a switch bar 102 into position to close a circuit through a lead 103 which operates a solenoid 104 to move a switch bar 105 into position to close a circuit through a lead 107 and a resistance 108 to the printing light 78.

Similarly a signal carried by the film cooperates with the mirror 84 to actuate a photo-electric cell 111 which through a lead 112 operates a magnet 113 to move a switch bar 114 into contact with a lead 115 which closes a circuit to a solenoid 116 which pulls a switch arm 117 into position to cooperate with a lead 119 to close a circuit through a resistance 120 to the light source 78.

As previously described in connection with the form of the invention shown in Figure 1, several of the foregoing resistance units may be operated simultaneously and the number may be increased as desired. It is to be understood that when any incandescent light source is reduced in voltage below a certain point its color characteristics change. Under certain conditions, therefore, in order to avoid such changes it is desirable to place a color filter 123 in the light beam so that the printing is carried out by monochromatic light.

As previously stated, similar results may be obtained by changing the speed of operation of the motor which drives the film. As the speed of the motor drive is decreased, the exposure of the film will be longer and consequently the effect of the printing light greater. Such results may be accomplished in the manner shown in Figure 10, but with the several resistance elements placed in circuit with a motor M as shown in Figure 11. A resistance element 120' may correspond exactly to the resistance element 120 and be operated in a similar manner. As its resistance is placed in the motor circuit, the speed of the sprocket 128 will be decreased while a printing lamp 78' remains constant. Other resistance elements, exactly corresponding to 94 and 108 of Figure 10, may be added to the structure of Figure 11 and operated in exactly the same way. Such additional resistance elements, therefore, need not be illustrated and described in detail. If desired through separate signalling operations the screens of Figure 1 and the resistances of Figures 10 and 11 may be combined.

Figure 12 shows a preferred modification of the device of Figures 10 and 11. As a resistance wiping arm 131 is moved by a solenoid 132 to the right as viewed in Figure 11, it moves across a variable resistance 133 which is in circuit with the motor M', thus gradually instead of suddenly decreasing its speed and hence slowly changing the intensity of the printing light. Similarly, as the arm 131 is released by the raising of the detent 135, which corresponds to the detents 41, the arm 131 moves relatively slowly to the left under the influence of a dash-pot 137. It will thus be seen that we have provided means automatically "fading in" and "fading out" in response to pre-determined signalling operations. The solenoid 132 may be operated exactly as are the solenoids 92, 104 and 116.

As previously stated, if desired, instead of changing the density of the positive film to be printed or the positive resulting from the reversal of a negative by means of signals predeterminedly placed thereon we may determine such density by the density of the negative film itself.

As previously stated, instead of depending upon signals predeterminedly placed upon the negative film for the automatic or other actuation of the machanism by which the intensity of the printing light is changed, we may depend upon the density of the negative film itself.

As is shown in Figures 13 and 14, we may operate our invention in part manually. A negative film 140 may pass through a signalling gate 141 with an aperture through which a signal light 142 passes a beam which impinges upon a photoelectric cell 143, the current from which is amplified in any well known desired way as indicated at 144. Such amplified current passes through a winding 145 which operates a core 146. Attached to this core is a pointer 147 which is moved in one direction by the strength of the attraction exerted upon the core by the winding and moved in the other direction by a spring 148. The end of the pointer cooperates with markings 149 which indicate the density of the negative.

A printing light 151 projects a beam upon a printing gate 152 through which, if desired, a positive film 153 may also be passed. The negative film and the positive film, if employed, are both fed by a sprocket 154 which is driven through any desired connection (not shown) by a motor 155. A series of screens 156, each provided with a handle 157 are mounted for movement from and to positions wherein they intercept the beam of light passing from the source 151 to the printing gate 152. As the operator wishes to make a major change in the intensity of the printing light, he manually moves one or more of these screens as desired. A variable resistance 158 is arranged for inclusion in the circuit of the motor 155 by means of a wiper arm 159 operated by a handle 160. To effectuate the desired minor changes in the intensity of the printing light, the operator moves the handle 160 thereby decreasing or increasing the resistance in circuit with the motor and hence the time of exposure and the effectiveness of the printing light.

Figure 14 shows an alternative arrangement in which a pilot light source 161 illuminates a ground glass or similar material 162 and a sighting aperture 163 through which the operator views the negative film as it passes by, and changes the printing intensity. In accordance with his judgment, he operates the screens 156 and the resistance 159.

The two forms of our invention shown above are particularly applicable when a negative is to be reversed into a positive and pre-timing is not practicable. It may be used however, for a printing operation and is particularly useful in the quick making of rough first prints or "rushes."

Figure 16 shows the form of our invention shown in Figures 1, 9, 10 and 11 applied to the printing of a positive film 163 from a negative film 11' as at a printing aperture 74'.

Obviously the light which is passed through any image will vary inversely as the density of that image and hence will form a sufficiently accurate guide to the printing light which should be projected through that image in order to secure a uniform result.

In the form of our invention shown in Figure 17, we pass a negative film 175 through the pilot gate 77. The pilot light source 75 directs light through the film at an aperture 76 and upon a mirror 14'. Thereupon it may be reflected by the mirror 14' upon a cell 178.

In such cases as when we are reversing a negative in order to form it into a positive, the pilot light 75, and others corresponding thereto, has non-actinic characteristics. The cell 178 may be of any desired type or of the photolytic type or of a heat responsive type such as a thermocouple. After passing through the pilot gate, the film is drawn through a printing gate from a source 182. At this point, if our invention is applied to a printing process, a positive film 183 may be introduced. It will be readily understood that the printing operation may be of the continuous or step type. The printing operation as such forms no part of the present invention, since the present invention lies in the control of the printing operation and not in the printing operation per se.

Current proceeding from the photo-electric cell 178 is amplified in any desired manner as indicated at 184. The amplified current proceeds through a lead 185 to a winding 186 which controls a core 187 pivoted at 188 and carrying a wiper arm 189 which cooperates with a variable resistance 190 which is in circuit with the light source 182. It will thus be readily understood that as the current which passes from the amplifying element 184 is increased in response to an increased effective brilliance in the light passing from the pilot light 75 through a negative film 175 of less density, the wiper arm 189 will be moved to the right as shown in Figure 15 and more resistance placed in the circuit of the light source 182 thus decreasing its effectiveness and decreasing the printing light. Similarly when the amplified current is diminished, a spring 191 will pull the wiper arm 189 to the left as viewed in the drawings thus increasing the brilliance and effectiveness of the light source 182.

If a radiant-responsive element 178 is used which increases its electrical output as the light impinging upon it is decreased, the resistance 190 is arranged so that the movement of the wiper arm 189 to the right decreases instead of increases the resistance in circuit with the printing light source 182. In either case, it will be understood that the effective light output of the two light sources always varies inversely.

Figure 18 shows similar apparatus but applied to the control of the printing operation by means of changes in the speed of the drive of the film as it passes through a printing light. As previously explained, it will be understood that the amount of the exposure and consequently the density of the reversed or positive film is directly varied as is the time of exposure at the aperture. Consequently, if the speed of movement of the film be decreased, the exposure will be greater and the resulting positive subjected to a greater effective printing or reversal light while on the other hand if the speed of movement of the film is increased the exposure will be shorter and the positive subjected to a printing or reversal light.

As shown in Figure 18, a negative film 193 may be drawn through a pilot gate 194 through which a pilot light 195 passes light which controls a photo-electric cell 196. Thereupon the negative film, and a positive film 197 if desired, may be drawn through a printing gate 198 under the influence of a printing light 199 by a sprocket 200 driven in any desired or conventional way by a motor 201. The current proceeding from the cell 196, which corresponds to the cell 178, is amplified as indicated at 203. Through a lead 204 the amplified current is passed through a winding 205 which attracts a core 206 which is pivoted at 207 for movement with a resistance wiper arm 208 against the power of a spring 209. The wiper arm 208 passes over a variable resistance 211 which is connected in series with the motor 201. Consequently the amount of resistance in this circuit and hence the speed of operation of the film and the resulting density of printing are conditioned by the amount of light passed through the negative film by the pilot light 195. If the effective electrical output of the cell 196 is increased in direct proportion to the light impinging upon it, the resistance 211 is so connected in the circuit of the motor 201 that this increase in effective brilliance of the pilot light decreases the amount of resistance in circuit with the motor and hence increases its speed but with a resulting decrease in printing effectiveness of the printing light 199, as shown in Figure 18.

Figure 19 generally corresponds to Figure 18, but shows our invention applied to mechanism wherein the speed of the motor is somewhat more accurately determined than is possible with the resistance element which we employ in the mechanism which is shown in Figure 18.

As before a negative film 215 is passed through a pilot gate 216 under the influence of a pilot light 217 which controls an element 218 responsive to radiant energy and then through a printing gate 220 drawn by a sprocket 221 past a printing light 222, the positive film 223 being introduced at this point, if desired, and passed with the negative film past the printing light 222. The current proceeding from the element 218 is amplified as at 226. The amplified current through a lead 227 is passed through a winding 228 which controls a core 229 pivoted at 230 and carrying a wiper arm 231 which through a resistance 232 controls the amount of current passing from a battery through a special braking winding 233 in the shunt wound motor 234 which drives the sprocket 221 in any conventional or desired manner. As previously explained the amount of amplified current passing through the winding 228 determines the position of the core 229 and consequently the amount of current passing through the resistance 232 which in turn determines the amount of current passing through the winding 233. As will be readily understood by those skilled in the electrical art the current passing through the winding 233 may be arranged to set up a counter electromotive force which is in effect a braking action which directly and accurately determines the effective speed of the motor 234. It will thus be understood that the amount of light to which the films 215 and 223 is subjected from the printing light source 222 is accurately controlled by the light which impinges upon the pilot photo-electric cell 218.

Figure 18 shows another modification of our invention in which the speed of the motor is controlled by braking mechanism of the pump type, long recognized as extremely accurate.

A negative film 241 is moved through a pilot gate 242 and a printing gate 243 by a sprocket 244 which is driven in a manner later described by a motor 245. In the pilot gate the negative is subjected to light from a pilot light 247 which passes through the film and upon a photo-electric cell 248. The printing light 249 is maintained at a constant level of intensity. The current proceeding from the cell 248 is amplified as at 251 and through a lead 252 passes through a winding 253 which controls a core 254 pivoted for movement with a pinion 255 and movable against the influence of a spring 256 attached to an arm 256' which moves with the core 254. The pinion 255 through a gear 257 operates a toothed bar 258 one end of which is formed into a needle point 259. It will be seen, therefore, that the needle point is moved in accordance with the amount of current passing through the winding 253. Gears 260 form a portion of a train which transmits motion from the motor 245 to the sprocket 244. These gears work in a housing 261 which has a connection 262 with the oil reservoir 263. The revolution of the gears 262 will pump oil from the reservoir 263 past the needle 259 and through a tube 264. The amount of the opening in the tube 264, which is determined by the position of the needle 259, will, of course, determine the speed of the flow of the oil. As is well understood the resistance which the flow of the oil applies to the gears 260 forms one of the most accurate and dependable braking mechanisms which is in use. A relief valve 265 is provided to take care of emergencies.

As previously stated in this specification, under many circumstances we prefer to secure the relatively large gradations of light by means of the interposition of a series of screens of uniform density and the minor variations by changes in the speed of film movement or intensity of the light at its source. The accuracy, elasticity and efficiency of such operations are apparent.

Figure 21 shows diagrammatically a preferred form of our invention, in which the operation is entirely automatic, and the gradations are secured as above. In carrying out this form of our invention, we may pass a negative film 275 through a pilot gate 276 past a pilot light source 277 and a photo-electric cell 278, the pilot light 277 having non-actinic characteristics if our invention is applied to a reversal operation. In place of the photo-electric cell 278 we may use photolytic material or a thermo-couple. The film is then drawn through a printing gate 279 by a sprocket 280 and subjected to a printing light from a source 281. At this point, if our invention is applied to a printing process, a positive film 283 may be introduced. The current proceeding from the element 278 is amplified in any desired or conventional apparatus generally indicated at 286. The amplified current thence proceeds through a lead 287 to a first of a succession of closely interrelated controlling units. It will be assumed that the operation of the apparatus is started at the point in which the desired intensity of the printing light is as great as possible so that thereafter a maximum amount of obscuration is introduced into the light beam. At this point, the negative being of maximum density, a minimum amount of light is passing therethrough and impinging upon the cell 278. The amplified current from the lead 287 passes to a winding 288 which controls the movement of the core pivoted at 289 and carrying a wiper and switching arm 290 which operates a resistance 291 in circuit with the light source 281. As previously explained, an increase in the effectiveness of the amplified current will move the wiper arm 290 to the right as viewed in Figure 21 against the power of a spring 292, thus placing more of the resistance 291 in circuit with the light source 281, while a lessening of this current will permit the spring 292 to move the arm 290 to the left and thus increase the amount of current passing through the light source. If the current passing through the lead 287 is sufficient to move the arm 290 the entire distance to the right, a switch block 294 supported thereupon and insulated therefrom contacts with the switch points 295 thus closing a circuit to a solenoid 296 which thereupon moves a switch arm 297 downwardly as viewed in Figure 21, thus breaking the previous circuit through the winding 288 and making a circuit through a lead 298 which operates a solenoid 299 to pull a switch arm 300 upwardly, as viewed in Figure 21, thus closing a circuit through a winding 302 and permitting the amplified current to pass therethrough. The operation of the solenoid 299 is also effective, as clearly shown in Figure 26, to move a screen 303 into light intercepting position and thus place the apparatus fully in the second stage of obscuration. Solenoids 296 and 304 are joined by a shaft 306 to which an arm 307 operating a link 308 is applied. A link 309 pivoted at 310 through a pin and slot connection 311 operates the screen 303. The actuation of the solenoid 296 moves the screen 303 from full line or non-shielding position to the dotted line or shielding position of Figure 26, while the actuation of the solenoid 304 will be effective to move the screen 303 from the dotted line to the full line position. The utility of the pin and slot connection will later be apparent in connection with later stages hereinbelow described. It is not necessary for the first and last stages, but as a matter of manufacturing practice we may prefer to make all connecting mechanism alike.

It will be readily understood that when the circuit through the winding 288 and the switch arm 297 is broken, the spring 292 will snap the arm 290 back to the neutral position.

It will be noted that as the switch arm 300 moves upwardly to close a circuit including the winding 302, it first impinges upon an elongated contact 313 which closes a circuit through the winding 302 before a lead 314 is energized, thus moving the core 315, which is pivoted at 316, and the contact and switch arm 317 mounted for movement therewith to the right before a switch member 318 mounted upon the switch arm 317 and insulated therefrom can become effective to energize two circuits, including one leading to the solenoid 304, which are controlled thereby. Increase of the amplified current through the winding 302 will be effective, as previously described, to move the arm 317 forwardly over a resistance 319, thus decreasing the effectiveness of the printing light source 281. When this signalling current becomes sufficiently great to move the arm 317 completely to the right as viewed in Figure 21, switch points 321 will be effective to close a circuit which through appropriate leads operates both parts 323 and 324 of a solenoid which is opposed to the solenoid 299. Such operation will be effective to move the switch arm 300 downwardly so that it breaks the circuit through the winding 302 and makes a circuit through a lead 327. To move the switch bar 300 clear of the elongated contact 313 after the circuit through the winding 323 is broken, a simple toggle is applied which is an exact duplicate, except in the length and power of its spring 327' of the toggle later described in connection with the switch bar 330. The power and length of the spring 327' are merely sufficient to move the switch bar 300 to the neutral position as shown in full line. This operation of the solenoid windings 323—324 also moves a screen 326 into light intercepting position, through mechanism, previously described, such as is shown in Figure 26. The lead 327 directly corresponds to the lead 298 previously described, and operates another stage of obscuration through unit mechanism which is an exact counterpart of that which has just been described. Any number of such stages, each a complete unit as described above, may be interposed between the second and final units above and later described respectively. In order to save space, since each of these units is identical with the others, description and illustration of them is omitted.

The lead corresponding to 327 in next to the final stage of obscuration is attached to a lead 328 which operates a solenoid 329 to draw a switch arm 330 upwardly to complete a circuit from the lead 287 through a winding 332 and at the same time breaks a circuit through the previous winding of the unit last previously in the line of succession, that is to say, the winding corresponding to 302 described above. As in the previously described unit, an elongated contact point 332' is supplied. The winding 332 operates a core 333 pivoted at 334 and operating a switch and contact arm 335 as previously described.

After the contact arm 334 is moved by a spring 336 to the left, owing to a decrease in the intensity of the signalling light, the reverse movement through the several units representing the several stages of obscuration takes place. A switch block 337 mounted upon the arm 335 and insulated therefrom through a lead 338 operates a solenoid 339 to break a circuit through the winding 332, and operates a lead 340 which is connected to a lead corresponding to a lead 341 in the control unit adjacent that which operates the final stage. In order to move the switch arm 330 completely off of the elongated switch point 332' controlling the winding 332 a simple toggle is supplied. This toggle comprises a rod 342 pivotally attached to the arm 330 and working in a guiding opening in a member 343 pivoted upon a base. A relatively weak spring 344 working between the member 343 and a collar 345 quickly moves the switch 330 to the full line position after the first short movement of the solenoid 339. Thereupon, the circuit to this solenoid is broken. The corresponding lead in the control unit adjacent the one shown in the drawings as intermediate the first and last units in the line operates the solenoid 299 which removes the screen 326 from operative position and closes the switch 300—313 and sets the toggle, thus again placing the arm 317 in operation for as long a period as may be signalled. When the signalling current passing through the lead 287 and switch arm 300 becomes diminished to a predetermined point, it moves the arm 317 completely to the left, thus through the switch block 318 mounted upon and insulated from the arm 317 closing a lead 347 which operates only one of the windings 323 of the double-wound solenoid previously described, thus, with the aid of the previously described toggle, pulling the switch bar 300 to a neutral position. Owing to the pin and slot connection previously described, this movement has no effect upon the screen 326, which has previously been removed from light obscuring position. The switch block 318, through a lead 349, likewise operates the solenoid 304 which moves the switch bar 297 into such position that the control current again passes through the winding 288. This operation of the solenoid 304 also removes the screen 303 from effective relation to the film.

In the above description of our invention it has been assumed that the progression of the changes in intensity will be regular from one stage to another, and then back again. It is of course understood that as a matter of fact these changes will be irregular and will go from one stage to another in either direction or may fluctuate within one stage for a long period.

As shown in Figure 22, the several light obscuring elements 303 and 326 and those intervening are formed of a material of uniform density which changes the amount of light which passes therethrough without changing its rate of vibration. Such filters are commonly made of ground glass or are gray in tone. In Figure 2B, as a preferred modification, we show filters 303' and 326' and those intervening which are composed of metallic mesh of varying degrees of fineness. The advantages of such light retarding means include a large reduction in the heat which passes from the light source to the film without any change in printing effectiveness. This reduction is particularly important in such cases as those in which our invention is applied to the reversal of a negative to a positive. In this process the negative is handled wet, or at least moist, and the ill effects of undue heat from the printing light source are more marked than with a dry film.

Alternatively to such movable screens, diaphragms may be employed and controlled similarly.

Figure 25 shows a printing light source 281' with a metallic mesh screen 346 permanently in the light beam in order to reduce the heat at all stages. Any other heat reducing medium may be employed. In addition, the screens described above, if desired, may be employed. The advantage of this plan is that it permits a light source of higher intensity to be used, and then filters out a certain amount of the heat without changing the light characteristics. Such a light source burned below its full intensity is not so likely to fluctuate with minor voltage variations, lasts much longer, and well lends itself to control by means of changes in the resistance in its circuit, as described above, since changes in intensity can be effectuated without changing color values, as is not possible with an incandescent light source burned to a critical intensity.

Instead of effectuating the minor variations as above by means of the introduction of resistance into the circuit of the light source, such minor variations may be accomplished by introducing resistance in the motor circuit, as shown in Figure 18 hereof, or using the motor brakes of Figures 19 and 20, in each case with the stages of obscuration and screens as above described.

In any form of our invention in case the pilot or signalling aperture is placed for convenience a considerable distance from the printing aperture, any suitable time-conserving electrical element or relay may be placed at any convenient point in the circuits controlled by the current passing from the signalling cell so that the changes in intensity at the printing aperture are properly timed.

If the photoelectric material is so transparent as to cause neither shadow nor distortion, it may be introduced directly into the pathway of the image-bearing light (that is, between negative and positive) and the use of more than one aperture or of a reflecting means rendered unnecessary.

Still another arrangement is to place the photoelectric material on the side of the positive film opposite to that from which the light is projected.

Under this plan the relatively small amount of light which passes through the positive film serves as the control element. Consequently the photoelectric material must be of much greater sensitiveness, but the complication of deflected light or of two apertures and a time element are eliminated. The undeveloped positive films are of sufficiently uniform density to render the variations in light which is projected through them of no practical consequence.

Different portions of each individual picture or "frame" in certain negatives may differ so widely as to make it desirable to make certain that the average density of the entire frame rather than the density of widely differing portions of it control the intensity of the light. This result can be achieved by the introduction into the path of the image-bearing light of a properly designed lens.

Instead of varying the intensity of the light by changing the intensity of the light-source, it is sometimes desirable to vary the amount of light which is allowed to become effective. This result is accomplished by placing a diaphragm or iris in train with light-source, negative, photoelectric material and positive, and, by means of suitable electrical and mechanical means, causing the diaphragm to increase or diminish its diameter in accordance with the amount of current which flows through the photoelectric material.

When the positive film is to be tinted, toned, or colored, or for other reasons, it may be desired to print a certain picture more or less heavily than is normal. To meet this need, our invention provides that the resistance control member may be set at will a few points above or below normal, so that the automatic operation will be correspondingly (and uniformly) changed until this member is reset.

It will be readily understood that the application of this invention includes photographic printing of all kinds. The negatives may be in the form of films, single or in strips or rolls, or of glass plates, or the images from which the printing is done may be opaque, and the printing process by means of reflected light. Similarly, the positive prints may be single, or in strips, sheets or rolls, and of any material, including inter alia, Celluloid, paper, fabrics and glass.

As previously pointed out, our invention in all of its several aspects may be applied equally well either to a printing process in which a positive is reproduced from a negative or to a reversal process in which a negative is changed into a positive. Figure 24 shows the invention applied to a reversal process. A negative film 349 in process of reversal is fed through a pilot gate 276' and under the influence of a non-actinic pilot light 277' which operates a cell or a thermocouple 278', and through a printing gate 279' in which a printing light 281' through an aperture 350' reexposes the negative so that a positive ultimately results. The control of the printing light 281' by the cell 278' is exactly as described above for the light 281 by the cell 278.

Many of the characteristics, objects and advantages of our invention will be evident from the drawings which are a part hereof and from the foregoing portion of this specification. These advantages include the provision of a simple method whereby intensity of a printing or reversal light may be controlled either manually, or automatically, preferably through several stages, one instrumentality establishing the major gradation of each stage and another instrumentality determining the finer gradations within each stage. Other advantages flow from the provision of an automatic printing control whereby electrical resistance is used to vary the printing or reversal light or the speed of the motor. Still other advantages flow from the provision of method and apparatus whereby a photoelectric control automatically operates the intensity of printing or reversal lights.

We claim:

1. In a single substantially continuous motion picture printing operation, the method of changing the effectiveness of a printing light which comprises both modifying the light which is emitted by the source and changing the capacity of the source to emit light, one of such modifications being employed to secure the minor variations while the other of such changes is being employed to secure the major variations during such printing operation.

2. The method of substantially continuously producing a single motion picture film bearing successive positive images of uniform density from successive negative images of non-uniform density which comprises moving a film bearing negative images past a light source, interposing a succession of light obscuring means between the light source and the film for accomplishing the major variations, and between the interposition of each of said light obscuring means changing the amount of resistance in circuit with said light source for securing the finer variations which are desired.

3. In a motion picture printing operation, the method of changing the effectiveness of the light which is employed to produce a series of positive images of uniform density from a series of negative images of non-uniform density which comprises moving a film which is to bear said positive images past a light source, modifying the capacity of said source to deliver light to said negative images and to said film, reducing the amount of light passed between said source and the film, and determining the amount of such reduction and modification in accordance with the density of the negative images from which said positive images are being reproduced.

4. The method of carrying out a motion picture photographic printing operation which comprises moving a film past a light source, relatively infrequently interposing light diminishing means between the light source and the film to obtain a relatively large change of fixed amount in the effectiveness of the light source on the film, and between the times at which said light diminishing means are interposed making relatively slight and frequent variations in the resistance in circuit with said light source to obtain finer gradations in the effectiveness of the printing light.

5. The method of producing a motion picture film bearing positive images of uniform density from negative images of non-uniform density which comprises moving a film bearing negative images past a light source, determining the differences in the density of said negative images by passing radiant energy through said negative images and upon a substance responsive to the changes made in said energy by the differences therein caused by the differences in density of the negative images, materially changing the amount of light from said source which reaches the film in accordance with such determination thereby securing major gradations in the photographic effectiveness of such printing light, and likewise in accordance with such determination slightly varying the amount of resistance in circuit with said light source thereby securing minor gradations in such photographic effectiveness.

6. The method of substantially continuously producing a single motion picture film bearing positive images of uniform density from successive negative images of varying density which comprises moving a film bearing negative images past a light source, successively placing a series of light retarding instrumentalities of markedly different densities in the path of light, and gradually varying the photographic effectiveness of the printing light between the time of the interposition of one of said instrumentalities in said path and that at which another is so interposed.

7. The method of substantially continuously producing a single motion picture film bearing positive images of uniform density from successive negative images of varying density which comprises moving a film bearing negative images past a light source, successively and selectively placing a series of light retarding instrumentalities of differing powers in the path of light to secure major gradations in printing density, gradually and relatively slightly varying the effectiveness of the printing light in order to secure minor gradations, and using the variations in density of the negative images to determine which of said light retarding instrumentalities shall be employed and also to determine the slight variations in the effectiveness of the printing light.

8. In a motion picture photographic printing apparatus, a printing light source, means for directing light from said source upon a film, a plurality of light diminishing screens, each movable to and from operative light reducing position, means operable for separately moving each of said screens to its operative position, and means actuated by portions of the film of predeterminedly changed translucency for operating said screen moving means, the film being formed with such portions.

9. In a motion picture photographic printing apparatus, a printing light source, means for directing light from said source upon a film, a plurality of light diminishing screens, each movable to and from operative light reducing position, means operable for separately moving each of said screens to its operative position, means actuated by portions of the film of predeterminedly changed translucency for operating said screen moving means, and means operated concomitantly with the operation of said screen moving means for removing the screen last previously disposed in operative position from such position, the film being formed with such portions of predeterminedly changed translucency.

10. In a motion picture film printer, a source of printing light, means for feeding a film bearing successive images of varying degrees of density through light from said source, a plurality of light modifying screens, a separate movable mount for each of said screens, separate and successively operable operating means for moving each of said mounts and the screen carried thereby in relation to the path of light from said source, actuating means controlled by the differences in density of said successive images for actuating each of said operating means, and means controlled concomitantly with the operation of each of said operating means for rendering another of said operating means operable by said actuating means whereby said actuating means under the control of the differences in density of successive portions of the film selectively operates said screens.

11. In a motion picture film printer, a source of printing light, a plurality of instrumentalities each movable into and out of effective relation to said printing light, magnetic means for moving each of said instrumentalities in relation to said printing light, each of said magnetic means including a control circuit, means operated by the movement of each of said magnetic means to close the control circuit of another of said magnetic means and to open its own control circuit, and means for operating each of said magnetic means through its control circuit.

12. In a motion picture film printer, a source of printing light, a plurality of instrumentalities each movable into and out of effective relation to said printing light, magnetic means for moving each of said instrumentalities in relation to said printing light, each of said magnetic means including a control circuit, means operated by the movement of each of said magnetic means to close the control circuit of another of said magnetic means and to open its own control circuit, and means responsive to the variations in density of successive portions of the film for operating each of said magnetic means through its control circuit.

13. In a motion picture photographic printing apparatus, in combination, an electric printing lamp, at least one control lamp positioned for passing light through predetermined portions of the film having a translucency different from other corresponding portions, the film being provided with such portions, a plurality of electric resistance elements, means operable for separately connecting each of said resistance elements in the circuit of said printing lamp, electric means for separately operating each of said resistance connecting means, and means for actuating said electric means by said portions of the film having a different translucency.

14. In a motion picture photographic printing apparatus, in combination, an electric printing lamp, at least one control lamp positioned adjacent each side of the film for passing light through predetermined side edge portions of the film having a translucency different from other corresponding portions, the film being provided with such portions, a plurality of electric resistance elements, means for connecting each of said resistance elements with a source of power, means operable for separately operating each of said resistance connecting means, and means for actuating said operating means by said portions of the film having changed translucency, said last named means including a separate photoelectric cell arranged for cooperation with each of said control lamps.

15. In a motion picture film printer, a source of light, means for moving a film bearing successive negative images through light from said source, a first means for reducing said light at such source, a second means for reducing the amount of light transmitted from said source to the film, and control means operatively interconnecting said first and second light reducing means and including devices for necessarily operating one thereof simultaneously with and as supplemental to the operation of the other thereof.

16. In a motion picture film printer, a source of light, means for moving a film bearing successive negative images through light from said source, a first means for changing the amount of light emitted by said source, a second means for changing the amount of light which can pass from said source and impinge upon the film, control means responsive to changes in the density of said successive images, and means operatively interconnecting said density responsive means and said first and second light changing means and including devices for necessarily operating said first and second means simultaneously and in accordance with variations in density of said successive images.

17. In a motion picture film printer, a source of light, means for feeding a film bearing successive negative images through light from said source, a first means for modifying said light at its source, a second means for modifying said light between its source and the film, and means actuated by one of said light modifying means for operating the other of said light modifying means.

18. In a motion picture film printer, a light source, means for feeding a film bearing successive negative images through light from said source, means for modifying the amount of light emitted by said source, means for modifying said light between said source and the film, each of said modifying means having a predetermined range of operation, control means responsive to changes in the density of said successive images, operative interconnection between said density responsive means and one of said modifying means for operating said means in accordance with said changes in density, and an operative interconnection between the other of said modifying means and said density responsive means for operating said modifying means at an extreme point in the range of operation of said first mentioned modifying means.

19. In a motion picture printing apparatus, a light source, means for feeding a film having successive negative images of different degrees of density through light from said source, control means responsive to the density of said successive images, a plurality of unit mechanisms each having instrumentalities for modifying the effectiveness of light from said source impinging upon the film, each of said light modifying means being effective within a predetermined range and representing successive stages of photographic light values, a connection between said unit mechanisms for rendering one of said unit mechanisms inoperative at an extreme point in its range of operation and for rendering the next unit mechanism in stage of light value operable, and means operated by said density responsive control means for operating each of said unit mechanisms within its own range of values.

20. In a motion picture printing apparatus, a printing light, a plurality of unit mechanisms each having means for changing the amount of resistance in circuit with said light source, operative interconnection between said unit mechanisms for rendering one of said mechanisms inoperable and another of said mechanisms operable when a predetermined amount of resistance has been introduced into said circuit by the first mentioned of said unit mechanisms, and means responsive to the density of said negative images for operating said resistance means of each of said unit mechanisms.

21. In a motion picture film printer, a source of printing light, means for changing the effectiveness of light from said source reaching a film having successive portions of varying degrees of density, said means including a plurality of rheostats, each of said rheostats having a circuit and a wiper arm which carries a switch element which when said wiper arm is moved to a predetermined position will break the circuit of said rheostat and close the circuit to another of said rheostats, and means for moving said wiper arm to said predetermined position.

22. In a motion picture film printer, a source of printing light, means for changing the effectiveness of light from said source reaching a film having successive portions of varying degrees of density, said means including a plurality of rheostats, each of said rheostats having a circuit and a wiper arm which carries a switch element which when said wiper arm is moved to a predetermined position will break the circuit of said rheostat and close the circuit to another of said rheostats, and means controlled by the variations in density of the film for moving said wiper arm to said predetermined position.

23. In a motion picture film printer, a source of light, means for moving a film bearing successive images of varying degrees of density through light from said source, an instrumentality movable into and out of the path of light from said source for markedly modifying the effectiveness of said light, means for moving said instrumentality, auxiliary means separate from said modifying means for slightly modifying said effectiveness, and control means for said auxiliary means operated by the movement of said moving means.

24. In a motion picture film printer, a source of light, means for moving a film bearing successive images of varying degrees of density through light from said source, an instrumentality movable into and out of the path of light from said source for markedly modifying the effectiveness of said light, means for moving said instrumentality, auxiliary means separate from said modifying means for slightly modifying said effectiveness, a circuit for operating said auxiliary means, means controlled by variations in the density of said successive images for feeding said circuit thereby operating said auxiliary means, and a switch for said circuit operated by the movement of said moving means.

25. In a motion picture film printer, a source of printing light, means for feeding a film bearing successive negative images of varying density through light from said source, gradually operable resistance in series with said light source, said resistance including a movable wiper arm, an armature operatively connected with said wiper arm for operating said arm, a coil for moving said armature, a photo-electric cell, a pilot light for passing light through said images and upon said cell, means for amplifying the electrical output of said cell, a connection for delivering current from said amplifying means to said coil thereby moving said wiper arm and gradually varying the effectiveness of said light source in accordance with the density of said successive images, a light modifying screen, means for moving said screen in relation to light from said printing source before it reaches said images, a solenoid for moving said screen, and switching means operated by the movement of said wiper arm for actuating said solenoid whereby the movement of said screen is carried out concomitantly with such gradual changes in the effectiveness of said light source.

26. In a motion picture film printer, a source of light, means for moving a film bearing successive images of varying degrees of density through light from said source, a series of light modifying instrumentalities each movable into the path of light from said source, each of said instrumentalities having a markedly different light modifying effect and each representing a distinct stage of light intensity, means for moving each of said instrumentalities into the path of light from said source, means associated with each of said instrumentalities for gradually changing the effectiveness of said light while each of said instrumentalities is in effective relation to the light thereby slightly modifying the effectiveness of said printing light, each of said means for gradually changing the light having a predetermined range of movement, control mechanism operated by said moving means in a first of said stages for placing the moving means applying to a second of said stages in such condition that it can be operated, and means operated by the means for gradually changing the effectiveness of the printing light associated with said moving means of said first stage for rendering the moving means of said second stage operable when said means for gradually changing said light reaches a predetermined position in its range of movement.

27. In a motion picture film printer, a source of light, means for moving a film bearing successive images of varying degrees of density through light from said source, a series of separate means for changing the effectiveness of said light, separate operating means for successively rendering each of said light changing means effective, separate withdrawing means for successively and separately rendering each of said light changing means ineffective, and control mechanism necessarily effective to render operative the one of said withdrawing means which is associated with the light changing means which is then operative and concurrently to render operative another of said light changing means.

28. In a motion picture film printer, a source of light, means for moving a film bearing successive negative images through light from said source, a series of light modifying instrumentalities each movable into the path of light from said source, separate means for successively moving each of said instrumentalities into the path of light from said source, separate means for removing each of said instrumentalities from said path of light, and mechanism necessarily operative to actuate the one of said removing means which is associated with the light modifying instrumentality which is disposed in said path concomitantly with the actuating of one of said means for moving another of said instrumentalities into said path whereby only one of said instrumentalities is disposed in said path at any one time.

WARREN DUNHAM FOSTER.
PEOPLES-PITTSBURGH TRUST
COMPANY,
*Executor of the Last Will and Testament of Earle L. Parmelee, Deceased.*
By GWILYM A. PRICE,
*Trust Officer.*